M. LEBLANC.
AUTOMATIC BALANCER FOR ROTATING BODIES.
APPLICATION FILED DEC. 1, 1913.
1,159,052.
Patented Nov. 2, 1915.
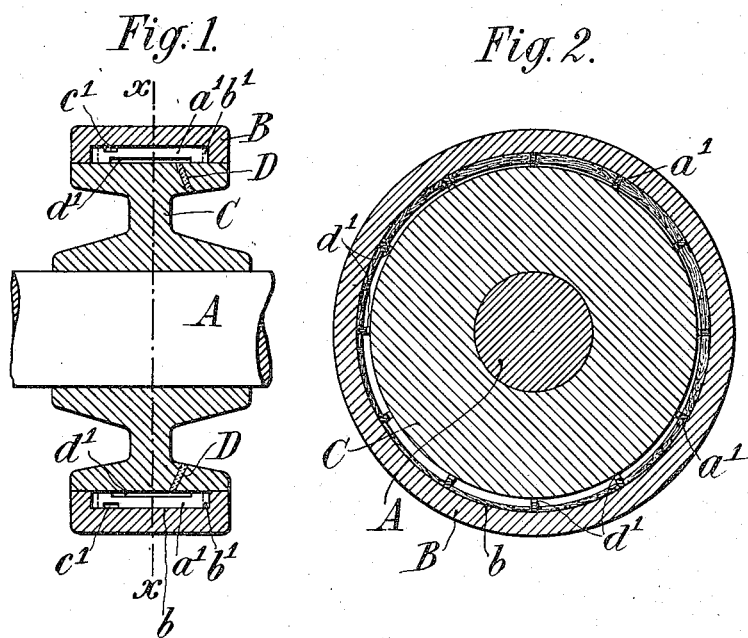

UNITED STATES PATENT OFFICE.

MAURICE LEBLANC, OF PARIS, FRANCE.

AUTOMATIC BALANCER FOR ROTATING BODIES.

1,159,052.  Specification of Letters Patent.  Patented Nov. 2, 1915.

Application filed December 1, 1913. Serial No. 803,970.

*To all whom it may concern:*

Be it known that I, MAURICE LEBLANC, a citizen of the Republic of France, residing in Paris, France, have invented certain new and useful Improvements in Automatic Balancers for Rotating Bodies, of which the following is a specification.

When it is required that a rotor should rotate very rapidly, it is necessary that its geometric axis should coincide very approximately with one of its principal axes of inertia through its center of gravity, which axis is called simply its axis of inertia in the following description. If this condition is not fulfilled, if the rotor shaft is rigid and its bearings fixed, the rotor rotates around its axis of symmetry, but exerts strong reactions on its points of supports. If the rotor shaft is flexible and rests in fixed bearings, or if the shaft is rigid and the bearings movable, or if a combination of these two conditions occurs, the rotor insead of rotating around its geometric axis, rotates around its axis of inertia, or at least around an axis very near to the latter. In these conditions there is no strong reaction on the points of support, but the shaft "whirls" according to the ordinary expression, which consequently strains the parts attached to the rotating members. Also the rotor should generally rotate with a small amount of clearance within the stator; to avoid rubbing contacts, in spite of the whirling action, it is necessary to increase the clearance and this is often disadvantageous.

The axis of inertia can be brought into coincidence with the geometric axis by attaching at the ends of the shaft two masses, the positions of whose centers of gravity are carefully arranged. Two additional masses are sufficient, but if a rotor comprises several wheels, it is preferable to first adjust the center of gravity of every wheel, so that it coincides with its geometric axis by means of an added mass and when the system has been mounted as a whole, to adjust the two end masses, in order to insure the coincidence of the axis of inertia with the geometric axis of the whole rotor. In this way the stresses exerted on the shaft during the rotation are reduced to a minimum. It is very difficult in practice to insure the coincidence of these axes, especially at very high speeds, and the equilibrium is destroyed if the rotor undergoes any deformation due to centrifugal forces during the rotation.

In my application No. 711,177, filed July 23, 1912 I have described and claimed balancers comprising masses secured to the rotor shaft and having a circular channel for each balancer, and a dense material, the particles of which are mobile, partly filling the said channels, by means of which the geometric axes of the rotor and the principal axes of inertia are automatically brought into at least approximate coincidence; and in said application I have illustrated several specific forms of such an apparatus. The present application is based upon one of the specific forms illustrated in the aforesaid application.

The accompanying drawings illustrate an embodiment of the present invention, Figure 1 being an axial section; Fig. 2 a transverse section on the line $x$—$x$ in Fig. 1.

Referring to the construction illustrated, the shaft A which is to be balanced carries a flywheel C upon which is shrunk a rim B provided with an internal groove $b$ which forms an annular channel around the flywheel. A certain quantity of mercury or other mobile material is introduced through holes D, after which the remainder of the annular passage may be filled with a viscous substance such as vaseline or fatty matter and finally the holes D are plugged. The mass of mercury within the annular passage represents the added masses above referred to whose centers of gravity can be displaced relatively to that of the rotor.

The particular point of the present application is the damping of any oscillatory movements of the mercury which might occur by reason of its acquiring a velocity different from that of the walls of the annular passage. For this purpose dampers of various sorts may be used. I prefer sheet iron plates $a'$ placed at equal intervals in grooves $b'$ at the sides of the annular passage, so that said plates $a'$ extend transversely across the passage. Each of these plates $a'$ has a small opening $c'$ near its outer edge, and another larger opening $d'$ near its inner edge. The mercury flows from one compartment to another through openings $c'$, while the flywheel is rotating and while the mass of mercury is seeking its position of equilibrium. The air or viscous material which fills the surplus space in the annular compartment can pass easily through the larger openings $d'$ along the inner edges of the damping plates.

The smaller the openings $c'$ the more damped are the movements of the mercury with relation to the walls of the annular passage. At the same time if the openings $c'$ were made too small the sensitiveness of the apparatus would be diminished; in case of accident, the flow of mercury from one position of equilibrium to another might take too long.

It is necessary to take into consideration the effects due to capillarity and surface tension. There should be sufficient mercury in each compartment to cover the small openings $c'$. If one compartment were full and an adjacent compartment empty, the mercury in flowing from the former to the latter through a very small hole, would meet with a very large resistance due to capillarity. To overcome this, considerable pressure must be developed by centrifugal force at the position of the opening and this requires a high speed in the balancer. Until this occurs the action may be very irregular. This drawback can be avoided with certainty, if there is sufficient mercury to fill all the compartments but one.

It is also necessary that the minimum thickness of the mercury ring when it has been displaced by the rotation, so that the axis of the free surface does not coincide with the geometric axis, should not be too small, or otherwise the surface tension would prevent the mercury from taking up its position freely. For this reason it is convenient that the mercury should almost completely fill the ring, that is that the volume of the layer of air or oil on the surface of the mercury should be always small compared to the volume of the latter.

Though I have described with great particularity of detail a specific embodiment of my invention, yet it is not to be understood that the invention is restricted to the particular embodiment described. Various modifications thereof in detail and in the arrangement and combination of the parts may be made by those skilled in the art without departing from the invention as defined in the following claims.

What I claim is:—

1. Balancers for a rotor which is capable of rotation about a principal axis of inertia through its center of gravity, said balancers comprising masses secured to the rotor shaft and having a circular channel for each balancer, and a dense material in said channel, the particles of which are mobile, and means for damping the motion of said material relatively to the walls of the channel containing it.

2. Balancers for a rotor which is capable of rotation about a principal axis of inertia through its center of gravity, said balancers comprising masses secured to the rotor shaft and having a circular channel for each balancer, and a dense material in said channel the particles of which are mobile, and plates arranged transversely across said channel and provided with apertures permitting a damped movement of said material relatively to the walls of the channel containing it.

3. Balancers for a rotor which is capable of rotation about a principal axis of inertia through its center of gravity, said balancers comprising masses secured to the rotor shaft and having a circular channel for each balancer, a heavy liquid in said channel, and means for damping the movement of said liquid relatively to the walls of the channel containing it.

4. Balancers for a rotor which is capable of rotation about a principal axis of inertia through its center of gravity, said balancers comprising masses secured to the rotor shaft and having a circular channel for each balancer, a heavy liquid in said channel, and plates arranged transversely across said channel and provided with small apertures permitting a damped movement of said material relatively to the walls of the channel containing it.

In witness whereof, I have hereunto signed my name in the presence of two subscribing witnesses.

MAURICE LEBLANC.

Witnesses:
HANSON C. COXE,
GABRIEL BELLIARD.